United States Patent [19]
Okamoto

[11] Patent Number: 5,891,332
[45] Date of Patent: Apr. 6, 1999

[54] MAGNETIC FILTRATION APPARATUS FOR PURIFYING WATER

[75] Inventor: Shouzou Okamoto, Okayama, Japan

[73] Assignee: Business Center Organization Co. Ltd., Okayama, Japan

[21] Appl. No.: 867,797

[22] Filed: Jun. 3, 1997

[30] Foreign Application Priority Data

Jun. 7, 1996 [JP] Japan .................................... 8-168440

[51] Int. Cl.[6] ............................ B01D 35/06; B01D 24/26
[52] U.S. Cl. ......................... 210/223; 210/222; 210/278; 210/287; 210/295; 210/416.1
[58] Field of Search .................................. 210/222, 223, 210/278, 295, 287, 416.1

[56] References Cited

U.S. PATENT DOCUMENTS

| | | | |
|---|---|---|---|
| 4,515,692 | 5/1985 | Chandler et al. | 210/278 |
| 5,468,373 | 11/1995 | Chou | 210/223 |

*Primary Examiner*—David A. Reifsnyder
*Attorney, Agent, or Firm*—Michael D. Bednarek; Kilpatrick Stockton LLP

[57] ABSTRACT

A method is provided for purifying raw water taken from a raw water reservoir. The method includes the steps of subjecting the raw water to magnetic treatment, causing the magnetically treated water to flow through a filter medium in a first direction for purification of the treated water, and discharging the purified water into the raw water reservoir. The method further includes the steps of causing the magnetically treated water to pass through the filter medium in a second direction opposite to the first direction, and discharging the oppositely passing water into the raw water reservoir. The apparatus for realizing the above method includes a water intake assembly, a filter assembly and a water discharge assembly. A magnetic treatment device is mounted on the water intake assembly for subjecting the raw water to magnetic treatment. A switching device is operated to cause the magnetically treated water to flow through the filter assembly selectively in the first and second directions.

5 Claims, 3 Drawing Sheets

MAGNETIC FILTRATION APPARATUS FOR PURIFYING WATER

BACKGROUND OF THE INVENTION

1. Field of the Invention

The present invention relates to a method of purifying raw water taken from a raw water reservoir such as a pond, a fish-breeding tank, a swimming pool and the like. The present invention also relates to a water purifying apparatus for purification of raw water.

2. Description of the Related Art

Conventionally, various filter mediums have been conveniently used for the purposes of purifying raw water. However, any filter medium will lose its initial filtration ability in repeated use, and therefore should be replaced or cleaned at proper intervals.

In this regard, the conventional filter medium will give rise to the following problems. Specifically, the above-mentioned intervals are shortened when a larger amount of raw water is subjected to purification. Thus, in the conventional purification method, the cost for replacing the filter medium will increase as the amount of raw water to be purified becomes large. Further, since the waste water resulting from the cleaning of the filter medium should be treated by a separate disposing apparatus, an additional installation space is needed, and thus the operating expenses increase accordingly.

SUMMARY OF THE INVENTION

It is, therefore, an object of the present invention to provide a method of purifying raw water taken from a raw water reservoir to overcome the problems described above.

It is also an object of the present invention to provide a water purifying apparatus for carrying out the above method.

According to one aspect of the present invention, there is provided a method of purifying raw water taken from a raw water reservoir comprising the steps of: subjecting the raw water to magnetic treatment; causing the magnetically treated water to flow through a filter medium in a first direction for purification of the treated water; and discharging the purified water into the raw water reservoir; wherein the method further comprises the steps of causing the magnetically treated water to pass through the filter medium in a second direction opposite to the first direction, and discharging the oppositely passing water into the raw water reservoir.

With such an arrangement, the raw water taken from the reservoir is subjected to magnetic treatment before purified by the filter medium. Since the molecules of the magnetically treated raw water are in an activated state, the purification by the filter medium is effectively performed.

Further, the filter medium is advantageously cleaned by the magnetically treated water passing through the filter medium in the second direction, and thus oriented water is discharged into the raw water reservoir. In this process, since there is no need to provide an additional apparatus for disposing of the post-cleaning water, the cost is remarkably decreased.

The magnetic treatment to the raw water may be performed by causing the raw water to pass through a magnetic field. The magnetic field may be provided by a plurality of pairs of magnets each pair having opposing North and South poles. In addition to the magnetic treatment to the raw water, the purified water may be also subjected to magnetic treatment before discharged into the raw water reservoir. The oppositely passing water may also be subjected to magnetic treatment before discharged into the raw water reservoir.

According to the second aspect of the present invention, there is provided a water purifying apparatus for raw water taken from a raw water reservoir comprising: a water intake assembly for drawing raw water from the raw water reservoir; a filter assembly connected to the water intake assembly for permitting passage of the raw water from the water intake assembly; a water discharge assembly connected to the filter assembly for discharging water from the filter assembly into the raw water reservoir; a magnetic treatment device mounted on the water intake assembly for subjecting the raw water to magnetic treatment; and a switching device for causing the magnetically treated water to flow through the filter assembly selectively in a first direction and in a second direction opposite to the first direction.

The switching device may be a three-way cock. The intake assembly may comprise a pump for sucking raw water from the raw water reservoir, a first intake pipe at one end immersed into the raw water reservoir and at an opposite end connected to the three-way cock, a second intake pipe at one end connected to the three-way cock and at an opposite end connected to the filter assembly, and a third intake pipe at one end connected to the three-way cock and at an opposite end connected the filter assembly. The first intake pipe carries the magnetic treatment device.

Further, the discharge assembly may comprise a first discharge pipe at one end connected to the filter assembly and a second discharge pipe at one end connected to the filter assembly. The opposite end of the second intake pipe may be connected to an upper portion of the filter assembly, whereas the opposite end of the third intake pipe may be connected to a lower portion of the filter assembly. Said one end of the first discharge pipe may be connected to the upper portion of the filter assembly, and said one end of the second discharge pipe may be connected to the lower portion of the filter assembly. The magnetic treatment device may comprise a plurality of pairs of magnets each pair having opposing North and South poles. At least one of the first and second discharge pipes may be provided with a magnetic treatment device.

Other objects, features and advantages of the present invention will be clearer from the detailed explanation of the preferred embodiments described below with reference to the accompanying drawings.

DETAILED DESCRIPTION OF THE PREFERRED EMBODIMENTS

Figure 1:
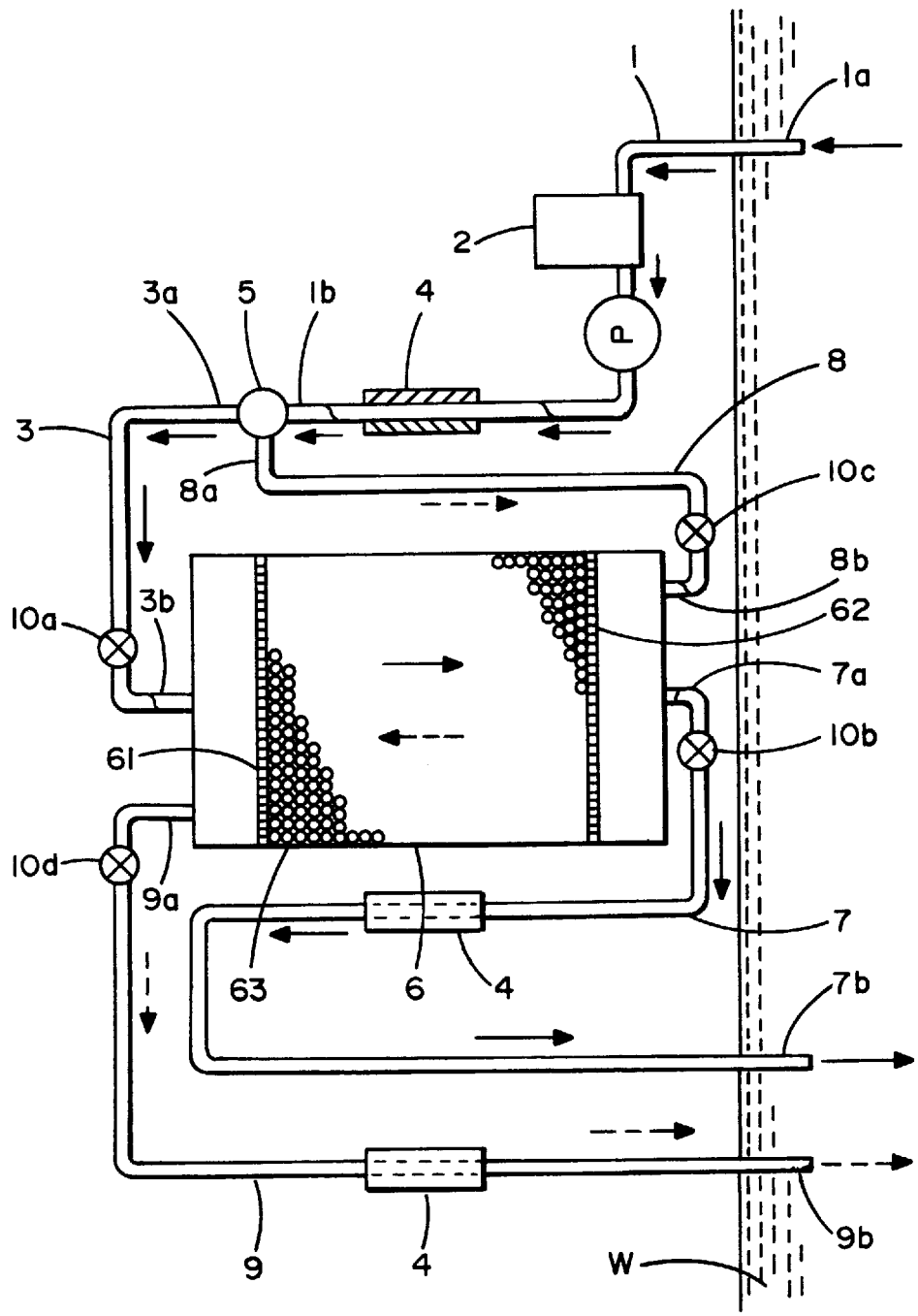
FIG. 1 is a schematic view showing a water purifying apparatus embodying the present invention.

Referring to FIG. 1, a preferred embodiment of the water purifying apparatus according to the present invention will be described.

The illustrated water purifying apparatus is used for purification of raw water taken from a raw water reservoir W. The reservoir may be a pond or a fish-breeding tank for example. For purifying operation, the above apparatus is generally constituted by a water intake assembly, a filter assembly and a water discharge assembly.

Specifically, the water intake assembly includes a pump P, a first intake pipe 1, a second intake pipe 3 and a third intake pipe 8. As illustrated, the pump P is mounted on the first intake pipe 1. In use, an end 1a of the first intake pipe 1 is immersed in the raw water reservoir W. The other or opposite end 1b of the first intake pipe is connected to a switching device 5 such as a three-way valve for example.

The first pipe 1 is also provided with a filter 2 between the pump P and the immersed end 1a. The filter 2 removes rather large refuse (i.e. noticeable to the eye) drawn into the first intake pipe 1. Additionally or alternatively, a strainer (not shown) may be mounted at the immersed end 1a of the first intake pipe 1 for the same purpose.

Further, the first intake pipe 1 is provided with a magnetic treatment device 4 between the the pump P and the opposite end 1b.

The magnetic treatment device 4 subjects the raw water passing therethrough to magnetic treatment, as described hereinafter. For this purpose, the magnetic treatment device 4 may include at least one permanent magnet. Preferably, a plurality of permanent magnets should be provided. In the illustrated magnetic treatment device 4 (FIG. 2), four permanent magnets (i.e. four pairs of horizontally opposing North and South poles) are vertically disposed. The cross-sectional arrangement for the magnet is shown in FIG. 3.

Figure 2:
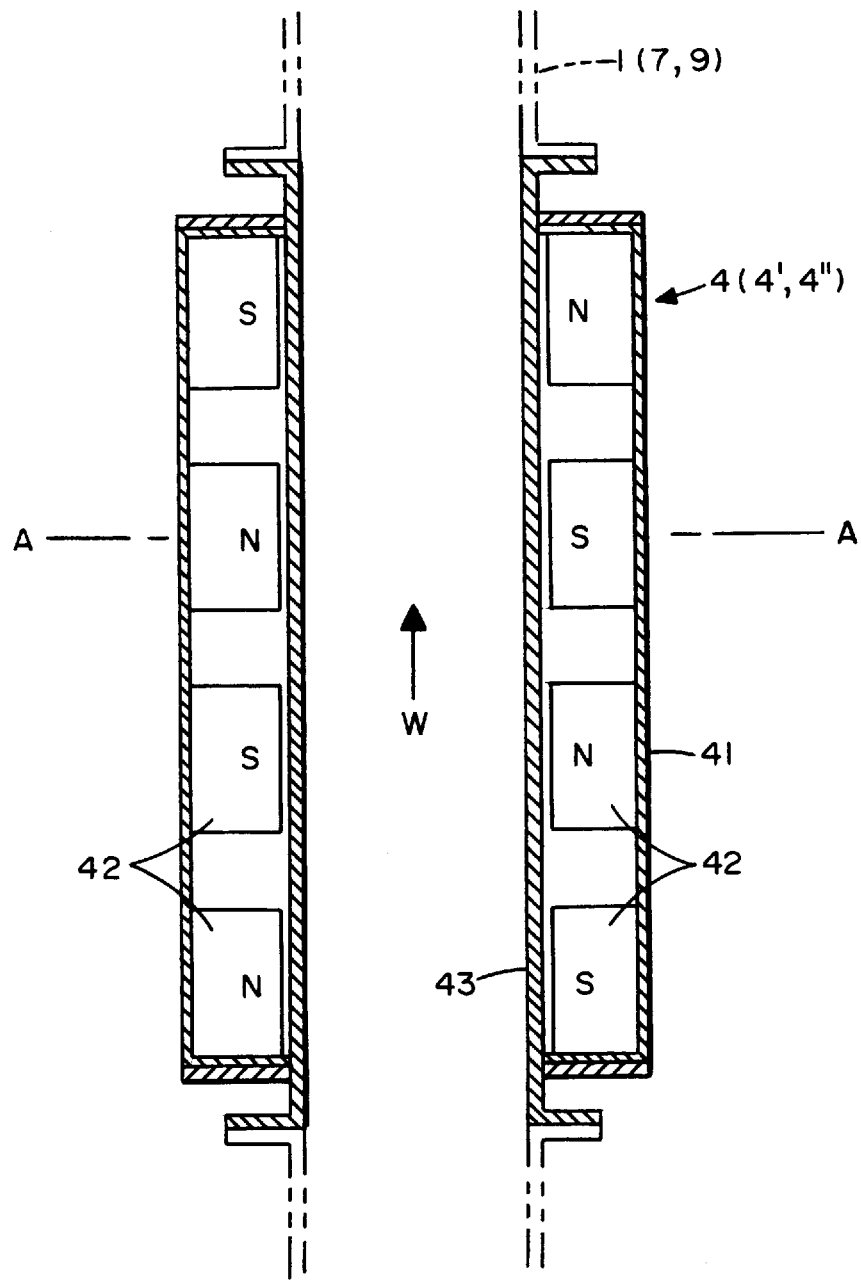
FIG. 2 is an enlarged sectional view illustrating the arrangement of the magnetic treatment device used for the water purifying apparatus of FIG. 1.
Figure 3:
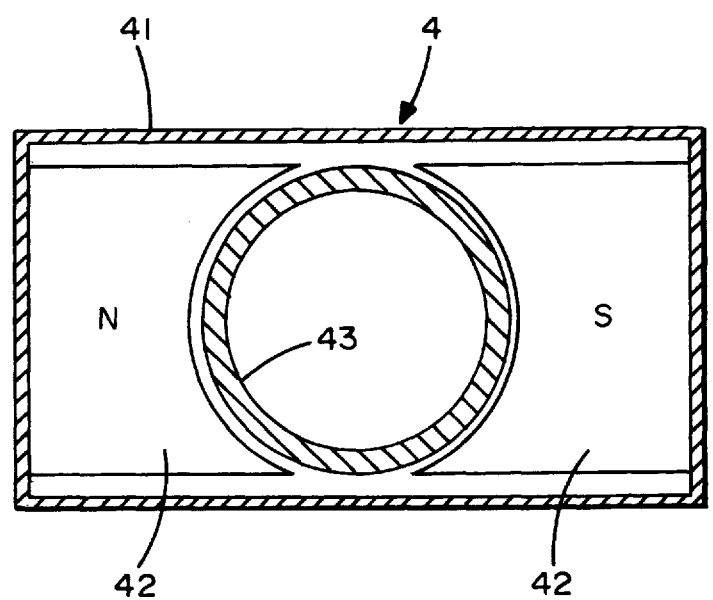
FIG. 3 is a cross-sectional view of the magnetic treatment device taken along A—A lines in FIG. 2.

In the magnetic treatment device shown in FIG. 2, the North poles (and the South poles) of the respective permanent magnets 42 are disposed on the different sides of the tube member 43 in an alternate manner. More specifically, the uppermost North pole is disposed on the right side of the tube member 43, the second North pole from above is disposed on the left side, the third North pole from above is disposed on the right side, and the lowermost North pole is disposed on the left side.

With such an arrangement, the magnetic fluxes of the respective magnets 42 are differently oriented. As a result, the molecules constituting the raw water passing through the magnetic treatment device 4 are effectively activated. However, alternately, all of the North poles (and South poles) may be arranged on a same side of the tube member 43.

The second intake pipe 3 of the water intake assembly is connected at an end 3a to the switching device 5 and at the other end 3b to an upper portion of of a filter tank 6. The second intake pipe 3 is provided with a valve 10a for controlling the passage of water flowing through the pipe 3 into the filter tank 6.

The third intake pipe 8 is connected at an end 8a to the switching device 5, while connected at the other end 8b to a lower portion of the filter tank 6. The third intake pipe 3 is provided with a valve 10c for controlling the passage of water flowing through the pipe 8 into the filter tank 6.

The filter assembly of the water purifying apparatus comprises the above-mentioned filter tank 6. The filter tank 6 includes an upper filter member 61, a lower filter member 62 and filter medium 61 disposed between the upper and lower filter members. The illustrated filter tank 6 is suitable for vertical installation (which means that the water in the tank 6 is caused to flow vertically). However, the present invention is also applicable to a filter tank designed for horizontal installation.

Commercially available filter mediums may be used for the filter medium 63. Preferably, each particle constituting the filter medium 63 has a large surface area as well as suitable surface configuration, so that a layer of microorganisms is easily formed over the surface. Further, the filter medium 63 is preferably made of a light plastic material capable of providing a reliable filtration performance for a sufficiently long time. Such a filter medium provides a greater filtration velocity in comparison with a sand filter. Further, the layer of microorganisms formed on the filter medium effectively captures small suspended matters in the raw water.

The water discharge assembly of the illustrated water purifying apparatus includes a first discharge pipe 7 and a second discharge pipe 9. As shown in FIG. 1, the first discharge pipe 7 has an end 7a connected to the lower portion of the filter tank 6 and an opposite end 7b immersed in the raw water reservoir W in use. The first discharge pipe 7 is provided with a valve 10b for controlling water passage out from the filter tank 6. The first discharge pipe 7 is provided for discharging the purified water into the raw water reservoir W.

On the other hand, the second discharge pipe 9 has an end 9a connected to the upper portion of the filter tank 6 and an opposite end 9b immersed in the raw water reservoir W in use. The second discharge pipe 9 is provided with a valve 10d for controlling water passage out from the filter tank 6. The second discharge pipe 9 is provided for discharging the upwardly passing water (indicated by the arrowed dotted line in FIG. 1) into the raw water reservoir W. The upwardly passing water is advantageously used to revive the filtration ability of the filter medium 63, as described hereinafter.

As shown in FIG. 1, additional magnetic treatment devices 4' and 4" may be mounted on the first and second discharge pipes 7 and 9, respectively. The magnetic treatment devices 4', 4" may be similar in construction and function to the magnetic treatment device 4 mounted on the first intake pipe 1.

Next, a water purifying method according to the present invention will be described below with reference to the above water purifying apparatus.

First, the valves 10c and 10d are closed, while the valves 10a and 10b are opened. Then, a switching device 5 is operated to allow water passage from the first intake pipe 1 into the second intake pipe 3. Upon starting the pump P, raw water is forced into the first intake pipe 1 from the raw water reservoir W, and further into the second intake pipe 3. While passing through the magnetic treatment device 4, the raw water is subjected to magnetic treatment. As a result, the molecules of the raw water are magnetically activated.

Then, the magnetically treated water is forced into the filter tank 6 and purified by the filter medium 63. Thus obtained purified water flows into the first discharge pipe 7 via the valve 10b which is currently opened, and finally discharged into the raw water reservoir W.

When the filtration performance of the filter medium 63 deteriorates over time, the following operations are performed. First, the valves 10a and 10b are closed, while the valves 10c and 10d are opened. Then, the switching device 5 is operated to allow water passage from the first intake pipe 1 into the third intake pipe 8. Upon starting the pump P, raw water is forced into the first intake pipe 1 from the raw water reservoir W, and further into the third intake pipe 8 via the magnetic treatment device 4. In this instance again, the magnetic treatment device 4 subjects the raw water to magnetic treatment, as described above.

Then, the magnetically treated water is led into the filter tank 6 from below. Thus, the water is caused to flow through the filter medium 63 upwardly or in the opposite direction indicated by the arrowed dotted line. Then, the oppositely passing water is led into the second discharge pipe 9, and finally discharged into the raw water reservoir W.

Since the discharged water from the second discharge pipe 9 contains a lot of microorganisms effective for water purification improved purification is expected for the raw water reservoir.

An additional magnetic treatment device may be mounted on either or both of the first and second discharge pipes 7 and 9. The magnetic treatment device 4' on the first discharge pipe 7 activates the molecules of the purified water. As a result, water purification for the reservoir W is further facilitated. On the other hand, the magnetic treatment device 4" mounted on the second discharge pipe 9 will promote the propagation of the microorganisms contained in the water. In this instance again, improved water purification for the reservoir W may be expected.

The method and the apparatus according to the present invention may also be applicable to obtaining potable water. For this purpose, however, the oppositely passing water or cleaning water for the filter medium 63 should be separately disposed of and not be brought back into the raw water reservoir W.

As described hereinbefore, according to the present invention, the purification performance by the filter medium is improved by application of the magnetic treatment to the raw water. Further, since the oppositely passing water is discharged into the original raw water reservoir, there is no need to provide an additional facility for disposing of the water. As a result, the water purifying apparatus of the present invention is compactly manufactured, and the operating expenses are remarkably reduced.

The preferred embodiments of the present invention being thus described, it is obvious that the same may be varied in many ways. Such variations are not to be regarded as a departure from the spirit and the scope of the present invention, and all such modifications as would be obvious to those skilled in the art are intended to be included within the scope of the following claims.

I claim:

1. A water purifying apparatus for purifying water taken from a raw water reservoir comprising:

a water intake assembly for drawing water from the raw water reservoir;

a filter assembly connected to the water intake assembly for permitting passage of the raw water from the water intake assembly;

a water discharge assembly connected to the filter assembly for discharging water from the filter assembly into the raw water reservoir;

a first magnetic treatment device mounted on the water intake assembly for subjecting the raw water to magnetic treatment; and a switching device for causing the magnetically treated water to flow through the filter assembly selectively in a first direction and in a second direction opposite to the first direction;

wherein the first discharge assembly comprises a first discharge pipe with one end of the first discharge pipe connected to the filter assembly and a second discharge pipe with one end of the second discharge pipe connected to the filter assembly.

2. The apparatus according to claim 1, wherein the intake assembly comprises a pump for sucking raw water from the raw water reservoir, a first intake pipe at one end immersed into the raw water reservoir and at an opposite end connected to the switching device, a second intake pipe at one end connected to the switching device and at an opposite end connected to the filter assembly, and a third intake pipe at one end connected to the switching device and at an opposite end connected to the filter assembly, the first intake pipe supporting the first magnetic treatment device.

3. The apparatus according to claim 1, wherein the opposite end of the second intake pipe is connected to an upper portion of the filter assembly, the opposite end of the third intake pipe is connected to a lower portion of the filter assembly, said one end of the first discharge pipe is connected to the upper portion of the filter assembly, and said one end of the second discharge pipe is connected to the lower portion of the filter assembly.

4. The apparatus according to claim 1, wherein the first magnetic treatment device comprises a plurality of pairs of permanent magnets each pair having opposing North and South poles.

5. The apparatus according to claim 1, wherein at least one of the first and second discharge pipes is provided with a second magnetic treatment device.

* * * * *